United States Patent [19]

Mansfield

[11] Patent Number: 4,791,864
[45] Date of Patent: Dec. 20, 1988

[54] DRAINAGE SYSTEM FOR EXPRESSING FIBROUS MATERIALS

[75] Inventor: Peter W. Mansfield, Holmes Beach, Fla.

[73] Assignee: The Dupps Company, Germantown, Ohio

[21] Appl. No.: 75,396

[22] Filed: Jul. 20, 1987

[51] Int. Cl.$^4$ .................................................. B30B 9/14
[52] U.S. Cl. ..................................... 100/117; 100/110; 100/113
[58] Field of Search .............. 100/110, 111, 113, 116, 100/117, 126, 127, 128, 129, 144–150

[56] References Cited

U.S. PATENT DOCUMENTS

| 301,795 | 7/1884 | Boomer | 100/113 |
| 1,648,477 | 11/1927 | French | 100/113 |
| 2,072,942 | 3/1937 | Carver | 100/113 |
| 2,876,698 | 3/1959 | Sisley | 100/147 |
| 4,413,554 | 11/1983 | Wallander | 100/127 |
| 4,644,861 | 2/1987 | Mansfield | 100/117 |

FOREIGN PATENT DOCUMENTS

| 2480672 | 10/1981 | France | 100/110 |
| 422672 | 12/1946 | Italy | 100/128 |
| 27994 | 12/1913 | United Kingdom | 100/110 |
| 2062482 | 5/1981 | United Kingdom | 100/117 |

Primary Examiner—Timothy F. Simone
Assistant Examiner—Corinne M. Reinckens
Attorney, Agent, or Firm—Charles J. Prescott

[57] ABSTRACT

A drainage system for expressing liquids and fluids from fibrous materials. The system includes a plurality of spaced apart compression elements each retained in juxaposition one to another so as to have a fluid escape slot between each adjacent compression element. Each compression element has a longitudinal passageway therethrough each having an inlet and an outlet which is inwardly tapered toward its outlet. The combination of passageways through each compression element forms a compression conduit whose inlet and outlet generally functionally coincide with the intake and exit, respectively, of the drainage system. The fibrous material to be expressed is introduced into the system's intake under pressure, the fibrous material being compressed as it is forcably urged through each tapered passageway, the expressed fluids exiting the compression conduit radially outwardly through fluid escape slots. The slots, which may be dynamically variable in width, are sized to facilitate fluid escape or discharge, but to contain the fibrous material within the compression conduit. The preferred embodiment of the shape of each taper is a truncated cone whose nominal diameter may also vary along the length of the compression conduit to prevent build-up and cloging of the fibrous material as it passes through the drainage system. This concept of fluid discharge slot variability during operation is also applied to improvements in conventional screw press cage screen bars.

13 Claims, 5 Drawing Sheets

DRAINAGE SYSTEM FOR EXPRESSING FIBROUS MATERIALS

BACKGROUND OF THE INVENTION

This invention relates generally to systems for expressing fluids and liquids from fibrous materials, and more particularly, to a continuous feed system having improved and simplified structure and dynamic adjustability.

The purpose of an expressing system for fibrous material is to extract a maximum amount of fluid from fibrous material passing under pressure therethrough. The percentage of fluids remaining in the fibrous material exiting such a system is a most pertinent gage for system efficiency.

Screw presses are typically used to express oils, liquids or fluids from fibrous materials such as sugar cane, sludges, and the like. These screw press systems include a main body or housing with drainage openings through the housing side walls and a feed worm connected onto a main shaft which is rotationally driven within the cage to compress the fubrous material as it is fed through such systems. Two such systems are described in my previous U.S. Pat. Nos. 4,440,076 and 4,644,861; other older screw press systems are described in the prior art cited in each of those two patents.

Several operational limitations may exist in conjunction with these well-known screw presses, especially those serving as the single dewatering operation. One such limitation is the inability to effectively vary the fluid slots between the cage of drainage bars which form the housing during system operation. This variability would enhance the operating efficiency of such systems.

In dewatering some fibrous materials such as paper sludge which contain a considerable amount of liquids, a common practice is to introduce a polymer into the fibrous material to facilitate the dewatering process. The efficiency of the expressing process is enhanced when the fibrous material is not churned or mixed during the expressing. Thus, conventional screw presses which do, in fact, force the fibrous materials through the expressing chamber while exerting considerable amount of disruptive forces as the material is expressed are not effective for expressing such polymerized slurrys during the initial free drainage periods.

The present invention is directed to a considerably simpler form of unique structure which is particularly adaptable to more heavily watered fibrous material and/or those in slurry form. The present system provides structure which, in one general embodiment, eliminates all internal moving parts thereby substantially reducing churning, maintenance costs, as well as the cost of manufacture and replacement components. Additionally, the preferred embodiment of the present system is adaptable to serve as a first, intermediate, or final stage of expressing fibrous materials in conjunction with the abovedescribed and/or other conventional dewatering means. In dewatering, some fibrous materials such as paper sludge, it is not always possible to obtain feed stock with consistent physical properties. Feed stock processing fibers with a short fiber length require drainage slots of smaller dimension while other feed stocks with longer fiber lengths will be contained within the compression chamber by larger drainage slots. Inherent in this invention is an adjustable means for dynamically varying the drainage slot while the system is operating to obtain the optimum drainage of liquid while containing the solids, for both the novel and preferred drainage system and conventional screw presses.

SUMMARY OF THE INVENTION

The present invention is directed to a variable slot drainage system for expressing liquids and fluids from fibrous materials. The system includes a plurality of spaced apart compression elements each retained in juxaposition one to another so as to form a fluid escape slot between each adjacent compression element. In the preferred embodiment, each compression element has a longitudinal passageway therethrough which is inwardly tapered from its inlet toward its outlet, the combination of passageways through each compression element forming a continuous compression conduit whose inlet and outlet generally functionally coincide with the intake and exit, respectively, of the drainage system. The fibrous material to be expressed is introduced into the system's intake under pressure, the fibrous material then being repeatedly compressed within each tapered passageway, after which the expressed fluids exit the compression conduit radially outwardly through a fluid escape slot. The slots, which may be dynamically variable in width, are sized to facilitate fluid discharge therethrough, but to contain the fibrous material within the compression conduit. The preferred embodiment of the shape of each taper is a truncated cone whose nominal diameter may also vary along the length of the compression conduit to prevent build-up and clogging of the fibrous material as it passes through the system. In another embodiment of the invention, a dynamically variable slot screen bar arrangement forming a cage for convention screw presses is also provided to achieve enhanced dewatering efficiency while also substantially fully containing the fibrous material during the pressurized dewatering process.

It is therefore an object of the present invention to provide an improved structure for expressing fluids and liquids from fibrous materials.

It is another object of the present invention to provide a system for expressing fluids and liquids from fibrous materials which is more economical to manufacture, service and repair.

It is another object of the present invention to provide a drainage system which is readily adjustable during operation to maximize radial discharge of fluids and liquids expressed from various forms of fibrous materials.

It is another object of the present invention to provide a drainage system whose design may be easily and conveniently varied in nominal transverse size along its length to regulate the degree of compression and the smooth even flow of the pressurized fibrous materials through the system.

It is yet another object of the present invention to provide a drainage system which may be integrated and interconnected to other forms of systems for expressing fibrous material such as screw presses.

It is yet another object of the present invention to provide a dynamically adjustable slotted housing for screw presses as disclosed in my earlier U.S. Pat. Nos. 4,440,076 and 4,644,861 and other older screw press systems as described in the prior art cited in each of those two patents.

It is yet another object of the present invention to provide a drainage system which substantially, if not completely, eliminates churning as the fibrous material passes through the system while being expressed.

In accordance with these and other objects which will become apparent hereinafter, the instant invention will now be described with reference to the accompanying drawings in which:

DETAILED DESCRIPTION OF THE INVENTION

Figure 1:
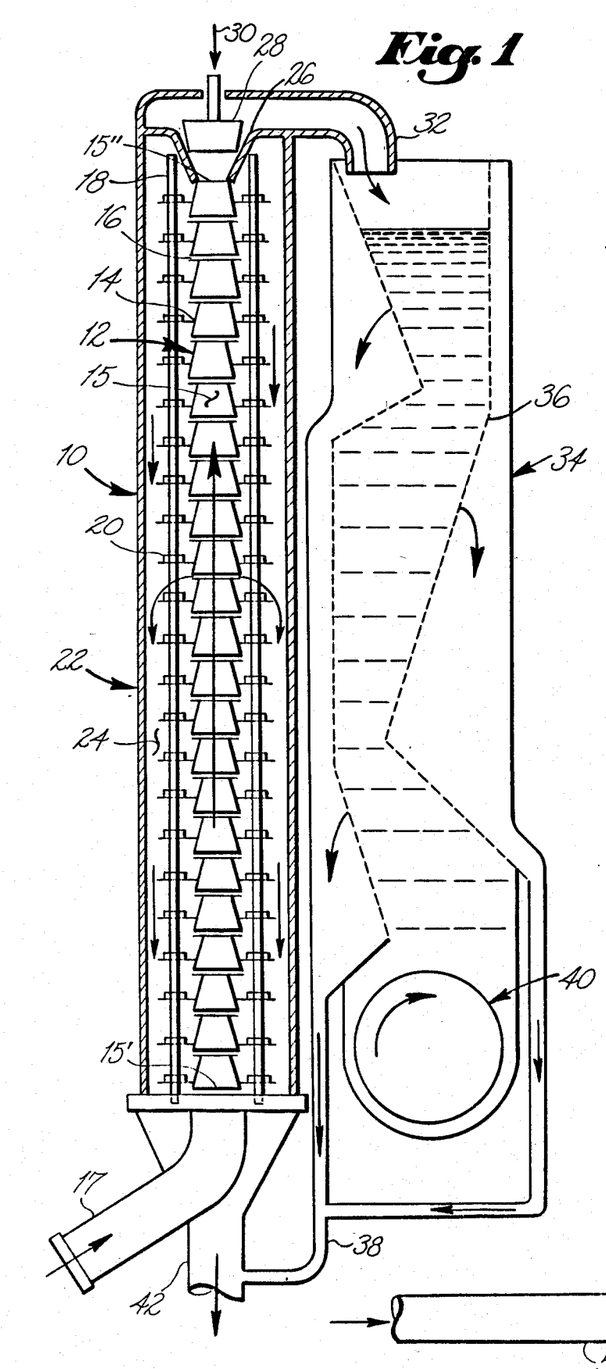
FIG. 1 is a front elevation schematic view of the preferred embodiment of the invention serving as an initial dewatering means in serriatum with a conventional screw press.

Referring now to the drawings, and particularly to FIG. 1, the preferred embodiment of the invention is shown generally at numeral 10 and includes a main drainage assembly 12 having a plurality of spaced apart compression elements 14 forming the drainage assembly 12. Each of the compression elements 14 is held in position and in spaced apart relationship one to another by elongated support rods 18 onto which retaining nuts 20 are adjustably mounted as will be described hereinbelow. By this arrangement, then, a fluid escape slot 16 is formed between each adjacent compression element 14 whose purpose will also be described hereinbelow.

Each compression element 14 and its associated longitudinal retaining nuts 20 for interconnection to support rods 18 is shown in schematic form for clarity to represent a tapered interior passageway through each compression element 14. When mounted in an arrangement of adjacent compression elements 14, then, a continuous compression conduit 15 is formed through the entire length of the drainage assembly 12. The inlet 15' of this compression conduit 15 is connected to an intake conduit 17, while the discharge or exit 15" of the compression conduit 15 is connected or in close proximity to a discharge conduit 32. In operation, then the fibrous material is forced under pressure into the intake conduit 17 in the direction of the arrow, forcing the fibrous material through the interior compression conduit 15 and then discharging from the discharge conduit 32 in the direction of the arrow. This first-stage drainage system 10 may be mounted in any orientation, either vertically as shown, or with the inlet 15' and exit 15" reversed, or the entire assembly 10 mounted horizontally or diagonally.

As the fibrous material is forced through the compression conduit 15, each of the compression elements 14 imposes a compressive or liquid expressing force on the fibrous material such that some of the fluids and liquids contained therein are expressed from the fibrous material by each of the compression elements 14. The fluid thus expressed is then discharged radially from the axis of the compression conduit 15 through fluid discharge slots 16. These expressed fluids, flowing out through slots 16 in the direction of the arrows are contained by outer chamber 22, then collecting and flowing downwardly therein into fluid collecting conduit 42.

To enhance the degree of compression of the fibrous mateial as it passes through the compression conduit 15, the preferred embodiment of the invention is arranged such that the compression conduit 15 is in an upright orientation wherein the weight of the fibrous material itself will add to the pressure created within the compression conduit 15. To further increase the internal pressure within the compression conduit 15, a restrictive plug 28 positioned within discharge conduit opening 26 is also provided. By applying variable restrictive force 30 to the tapered plug 28, the combination provides a flow restriction against the fibrous material discharging out of the exit 15" of the compression conduit 15. Obviously, then, by varying the restrictive force 30 the degree of restriction to flow of the fibrous material may be controlled, thus providing additional means for varying the expressing pressure within the compression conduit 15.

Although not part of the primary invention, the embodiment 10 depicted in FIG. 1 includes a conventional second stage of compressing the fibrous material shown generally at numeral 34. This second stage includes a conventional screw press 40 similar to those described in the Background section of this application. The fibrous material discharging in the direction of the arrow from discharge conduit 32 is collected into a feed hopper 36 formed of a rigid foraminous sheet material which allows additional liquids to be expressed in the direction of the arrows from the fibrous material as it is collected in the hopper 36. These discharged liquids are finally gathered into conduit 38 and discharged in the direction of the arrow through conduit 42 along with the previously expressed fluids.

Figure 2:
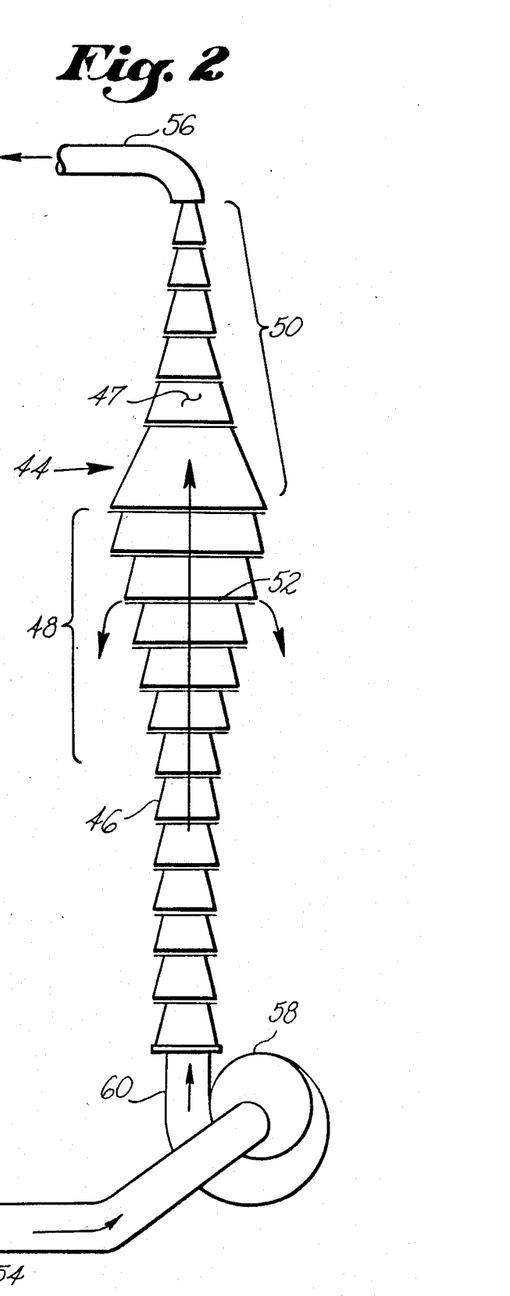
FIG. 2 is a front elevation schematic view of another embodiment of the invention.

Referring now to FIG. 2, an alternate embodiment of the preferred drainage assembly is shown schematically generally at 44, also including a plurality of compression elements 46. However, this embodiment 44 includes a section of compression elements 48 which increase in overall nominal diameter in the direction of fibrous material flow, followed by a section of compression elements 50 which decrease in nominal diameter in the direction of fibrous material passing therethrough.

The purpose of having the sections 48 and 50 of nominal compression element size is to vary the internal pressure within the compression conduit 47 by varying the rate of flow of the fibrous material through compression conduit 47, thus improving the efficiency of the overall degree of dewatering process. This embodiment 44 is also shown having a rotary pump 58 which receives the incoming fibrous material through intake 54 in the direction of the arrows and introduces the pressurized fibrous material into the compression conduit 47 at conduit 60 in the direction of the arrow there.

Figures 3, 4, 5, 6, 7, 8:
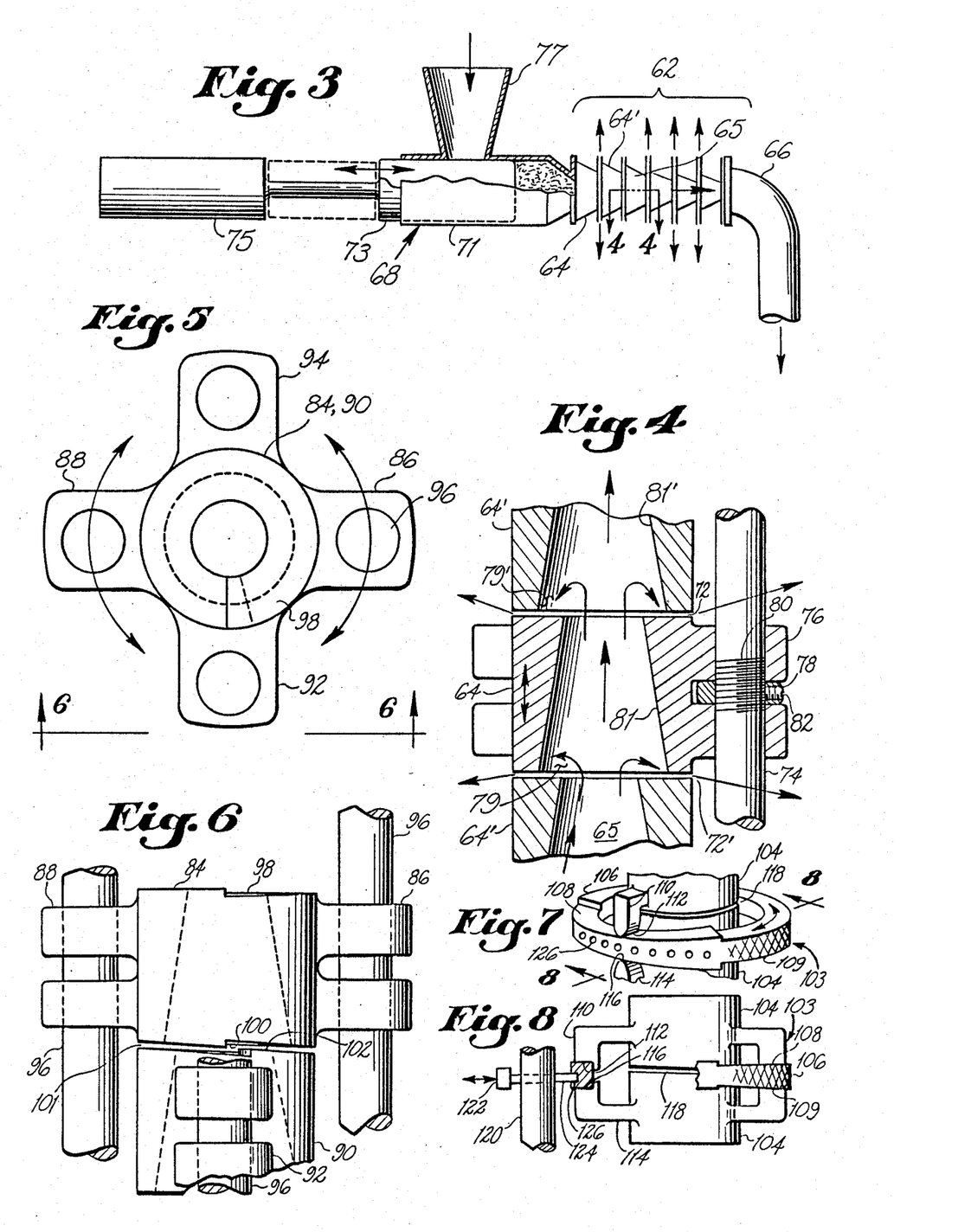
FIG. 3 is a front elevation partial schematic view of another embodiment of the invention.
FIG. 4 is an enlarged section view in the direction of arrows 4—4 in FIG. 3.
FIG. 5 is a top plan view of one embodiment of an adjacent pair of compression elements.
FIG. 6 is a view in the direction of arrows 6—6 in FIG. 5.
FIG. 7 is an enlarged perspective of another embodiment of the means for adjusting the fluid exit slot between each compression element.
FIG. 8 is a view in the direction of arrows 8—8 in FIG. 7.

Referring now to FIGS. 3 and 4, another embodiment of the invention is shown generally at 68 and includes a drainage system 62 (shown schematically in FIG. 3) having a plurality of compression elements 64 forming compression conduit 65 as previously described. The expressed fluids discharge radially outward from the fluid exit slots while the fibrous material is forced through the compression conduit 65 longitudinally in the direction of the arrow.

This embodiment 68 includes a reciprocating piston 73 moving in cylinder 71 which has hopper 77 thereabove for receiving the fibrous material thereinto. Pressure chamber 75 activates the piston 73 longitudinally back and forth in the direction of the arrows alternately compressing the fibrous material and forcing it into the compression conduit 65 of the drainage system 62. The dewatered fibrous material exits the system 62 via discharge conduit 66 in the direction of the arrow which may also act as a restrictive choke to increase internal pressure in compression conduit 65.

Referring particularly to FIG. 4, one embodiment of the fluid discharge slot adjusting means is therein depicted including collar 76 and 76' (not shown) integral to alternate compression elements 64 and 64' which slidably mate over elongated longitudinal support rod 74. The longitudinal spacing between compression elements 64 and 64' and support rod 74 is varied by rotating threaded nut 78 which, when rotated on the threaded portion 80 of support rod 74, displaces the compression elements 64 and 64' longitudinally one to another in the direction of the arrow, thus varying the width of the fluid discharge slots 72 and 72'. It should now be clear that the purpose of varying these slots 72 and 72' is to optimize on the dewatering efficiency of the system 62 by enhancing fluid discharge outwardly through slots 72 and 72'. By in-use dynamic adjustment and observation, each slot 72 and 72' may be brought to a maximum without allowing the fibrous material to also discharge therethrough. Once proper adjustment has been attained by rotating nut 78, lock screw 82 fixes same at that slot adjustment.

The preferred embodiment of the passageways 81 and 81' through each compression element 64 and 64' respectively is also shown in FIG. 4 to be that of a truncated cone. As the fibrous material exits each compression element 64 and 64' at the narrower end of the tapered passageways 81 and 81', a slight release in pressure is experienced by the fibrous material which may enhance the fluid flow into areas 79 and 79' into which the expressed fluids move, then outwardly through the slots 72 and 72' as shown by the arrows. The preferred angle for the walls of these conical passageways 81 and 81' is from about one to twenty degrees, while the preferred range of width of slots 72 and 72' is about from 0.001 inches to 0.120 inches. However, it is understood that certain fibrous materials may lend themselves to variations in both taper and slot beyond this preferred range depending also on rate (velocity) of internal flow of fibrous material.

Figures 9, 10, 11, 12, 13, 14, 15:
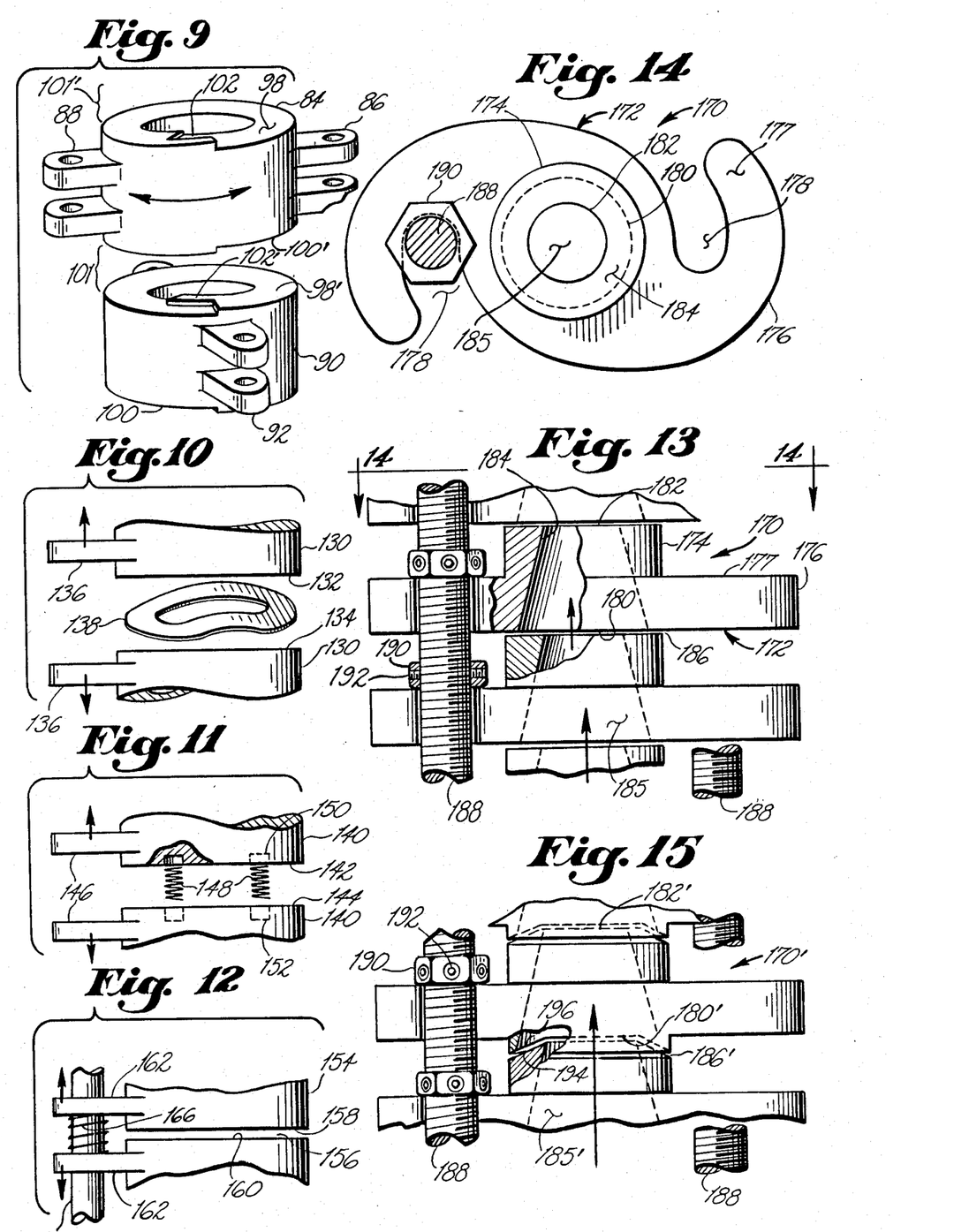
FIG. 9 is an enlarged perspective view of the adjacent compression elements shown in FIGS. 5 and 6.
FIG. 10 is an exploded side elevation view of another embodiment of the means for adjusting the fluid escape slot between each compression element.
FIG. 11 is an exploded side elevation view of another embodiment of the means for adjusting the fluid escape slot between each compression element.
FIG. 12 is an exploded side elevation view of another embodiment of the means for adjusting the fluid escape slot between each compression element.
FIG. 13 is a partially broken side elevation section view of another embodiment of the means for adjusting the fluid escape slot between each compression element, this embodiment also depicting replacable compression elements.
FIG. 14 is a view in the direction of arrows 14—14 in FIG. 13.
FIG. 15 is another embodiment of the invention similar to that in FIG. 13, except depicting an alternate contour for the fluid escape slot.

Referring now to FIGS. 5, 6 and 9, an embodiment of the means for adjusting the fluid discharge slot 101 is shown. This embodiment includes alternate compression elements 84 and 90 having mating end configurations 98 and 100 and 98' and 100' respectively which, when held in close proximity, but not touching one another, form the previously described fluid discharge slots 101 and 101', respectively therebetween. Compression elements 84 are mounted onto support shafts 96 by clevis portions 86 and 88, while the alternately positioned compression elements 90 are mounted by clevis portions 92 and 94 onto oppositely positioned support shafts 96. The interconnection between clevis portions 86, 88, 92 and 94 and shafts 96 is secured by set screws (not shown) or by adjusting nuts (not shown) as described in FIG. 4. By this arrangement, then, by rotating either alternate bank of compression elements 84 or 90, (compression elements 84 depicted being rotated in the direction of the arrows) all slots 101 and 101' are varied simultaneously in accordance with that angular rotation one to another of compression elements 84 and 90.

Referring now to FIGS. 7 and 8, another embodiment of the means for adjusting the fluid discharge slot 118 is shown generally at numeral 103. This embodiment 103 includes an annular ring 106 having at least one (two shown) opposing tapered surfaces 108 and 109 which act upon fingers 110 and 114 at their distal ends 112 and 116 respectively, and connected to compression elements 104. As the annular ring 106 is rotated in either direction of the arrows, fingers 110 and 114 are displaced apart in accordance with the tapered surfaces 108 and 109, thus varying slot 118 accordingly. Once the proper slot 118 size is selected, the compression elements 104, slidably held in position on rod 120 as previously described, are locked thusly by engaging pin 124 into annular collar 106 by moving handle 122 inwardly into mating cavity 126 in the outer surface of annular ring 106. This arrangement also affords individuality in the adjustment of each slot 118.

Referring now to FIGS. 10, 11 and 12, three additional alternate embodiments of the means for separating the adjacent compression elements and for varying the width of the fluid discharge slot therebetween are shown. In FIG. 10, that means is in the form of a "wavy" washer 138 which forcibly urges and separates the adjacent compression elements 130 slidably mounted by clevis 136 on a mating rod (not shown) in the direction of the arrows. The thin wavy washer 138, made of thin high spring steel, acts upon opposite surfaces 132 and 134 to effect this separation.

In FIG. 11, the means for separating the adjacent compression elements 140 is a plurality of compression coil springs 148 which mount into cavities 150 and 152 formed into the mating surfaces 142 and 144 as shown. Again, guide portions 146 slideably mounted onto longitudinal rods (not shown) provide the alignment and stabilizing structure for the entire arrangement of compression elements 140.

In FIG. 12, the means for maintaining the separation between compression elements 154 and associated mating surfaces 158 and 160 and slot 156 therebetween is coil spring 166 acting in compression against clevis 162 on rod 164 in the direction of the arrows. In all three embodiments shown in FIGS. 10, 11 and 12, the slot widths are varied by adjusting the end nuts threadably engaged on the support rod (not shown) as previously described.

Referring now to FIGS. 13 and 14, an alternate means for adjusting and maintaining the slot 186 between adjacent compression elements 174 is therein shown. This embodiment 170 also includes replaceable compression elements 172. Each compression element 172 includes a main body 174 having a tapered inner passageway 184 which functions to compress the fibrous material flowing in the direction of the arrow as previously described. Additionally, flange 176 is provided having opposing slots 178 which are adapted to mate around opposing longitudinal rods or support members 188 as shown. Thus, in replacing each of the compression elements 172, all that is required is that the flange portion 176 be rotated so as to disengage same from each of the support shafts 188.

In this embodiment 170, the means for controlling and varying the width of the slot 186 is in the form of adjustable nuts 192 which threadably engage over main support shafts 188 as shown. These nuts 192 are also lockable in any desired orientation by set screws 92. Thus, by adjustably rotating these nuts 192, the mating surfaces 177 of flange 176 will be forced to mate against the nut 192 by the compressive force of the fibrous material as it presses against the tapered passageway 184 as it passes through the compression conduit 185 formed by the plurality of compression element 172. A set screw (not shown) may be provided threadably engaged in flange against support shaft 199 to maintain slot 186 during low flow conditions.

Referring now to FIG. 15, essentially similar to that depicted in FIGS. 13 and 14, an alternate contour for the fluid discharge slot 186' is shown in the form of its downwardly tapered portion formed by the mating surfaces 194 and 196 as shown, these mating tapered portions 194 and 196 formed into the mating inlet and exit portions 180' and 182' respectively. This downwardly tapered portion of slot 186' is for enhanced fluid discharge in the preferred upright orientation of the axis of the compression conduit 185', that enhanced fluid discharge aided by the force of gravity.

Figure 16:
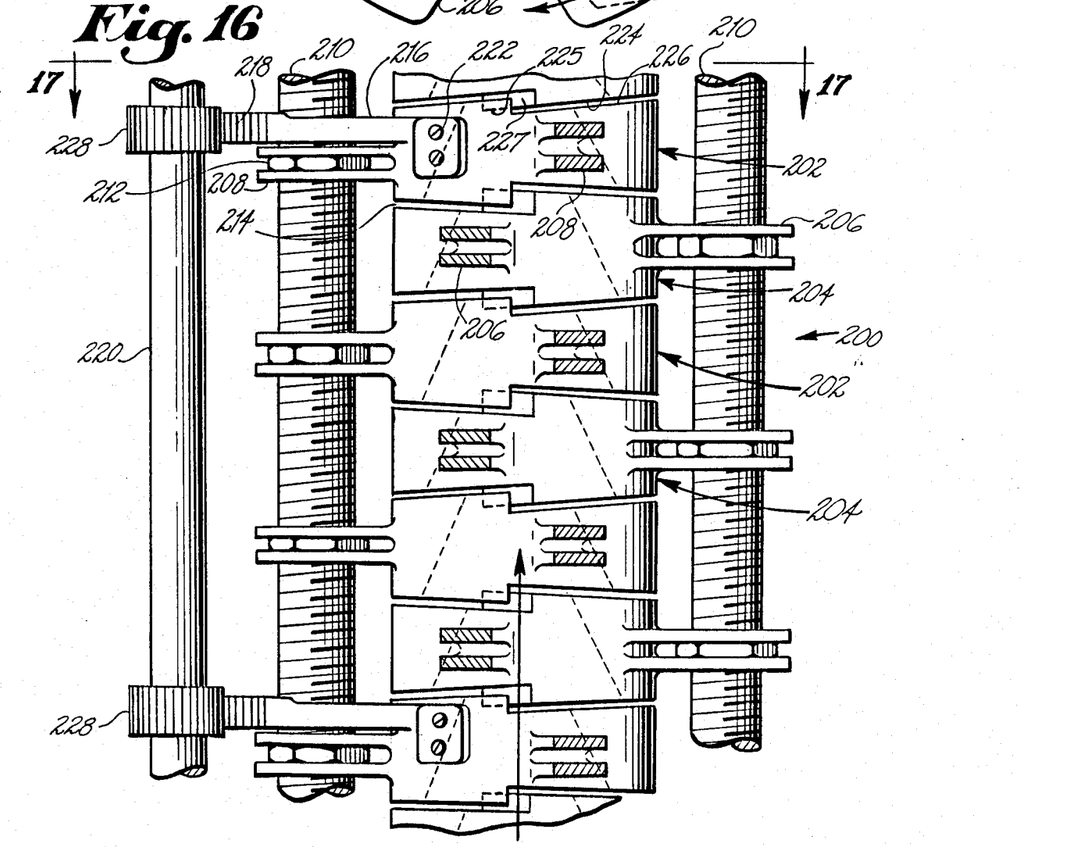
FIG. 16 is a front elevation view of a portion of the preferred embodiment of the adjusting means for varying the width of the fluid escape slot between each adjacent compression element.
Figure 17:
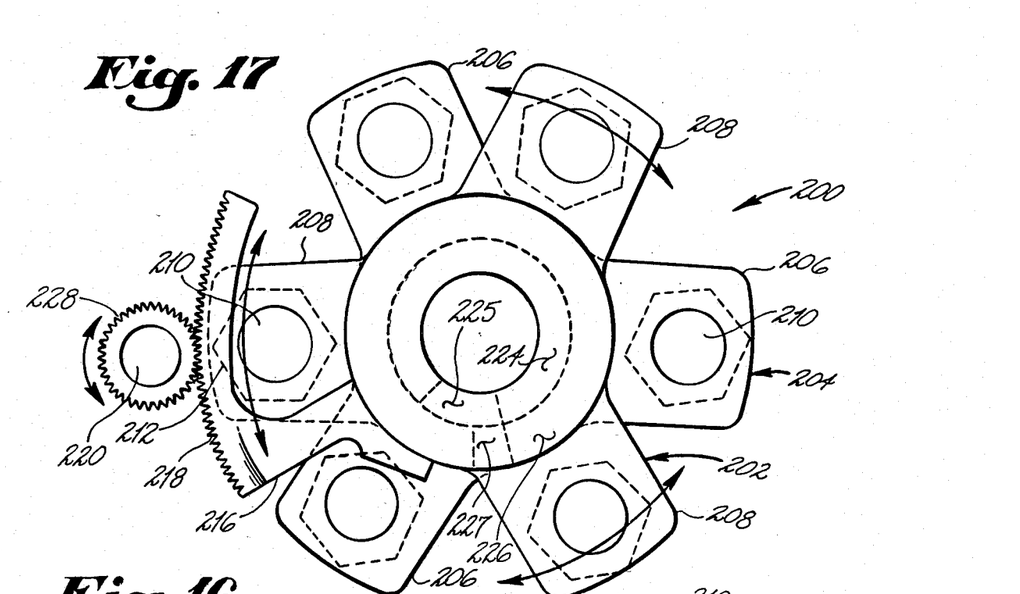
FIG. 17 is a view in the direction of arrows 17—17 in FIG. 16.

Referring now to FIGS. 16 and 17, the preferred embodiment for the means for rotating the alternate compression elements 202 and 204 is shown generally at numeral 200. Each alternate compression element 202 and 204, having clevis' 206 and 208 respectively, are mounted on threaded longitudinal support rods or shafts 210 as shown. Adjusting nuts 212, fitting within the clevaces 206 and 208, when rotated, serve to longitudinally reposition each compression element 202 and 204. Mating tapered surfaces 224 and 226 of the intake and discharge ends of each adjacent compression element 204 and 202 respectively, when rotated relative to one another, provide the mating structure which facilitates adjustability of fluid discharge slot 114 therebetween as previously described. As previously described in FIG. 9, tangs 225 in surface 224 mating into a sinularly shaped cavity in surface 226 prevent fibrous materials from exiting gap 227.

The means for rotating the alternate compression elements 202 vis-a-vis compression elements 204 is in the form of rack 216 having peripheral gear teeth 218 thereon. This rack 216 is bolted to a number of compression elements 202 such that, when longitudinal shaft 220 having gears 228 rigidly connected thereon is made to rotate in the direction of the arrow, rack 216 and the entire array of alternately positioned compression elements 202 also rotate in a corresponding direction. This rotation, then, varies each of the slots 214 between the compression elements 202 and 204.

Referring lastly to FIGS. 18 through 22, the basic concepts of variability of the fluid discharge slot for dewatering systems during their operation is shown adapted to a cylindrical outer housing 230 surrounding a conventional screw press system having a worm feed assembly mounted for rotation therein (not shown). The housing 230 includes a plurality of annular support rings 256 and 232, each alternately positioned along the length of the cage system 230. Two versions of the screen bars 242 and 246 are provided, screen bar 242 having tapering edge margins toward its distal ends 254, while screen bar 246 tapers along its edge margins from its broader end to its narrower end 248.

It should be noted here that, although the preferred embodiment of the screen bars is in the form of two separately screen bars 242 and 246, an alternate embodiment of these screen bars could be in the form wherein all screen bars are shaped similar to that depicted as numeral 246 and, further wherein all annular rings are of a similar configuration, each adapted to alternately secure the broader apertured end of the screen bar 246 and to slidably supportively receive the smaller second end 248.

Figure 18:
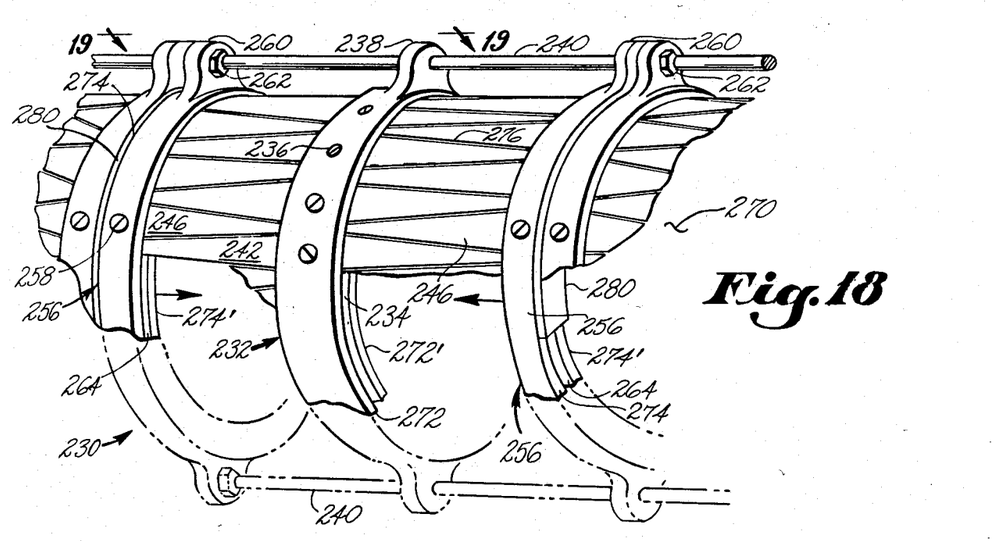
FIG. 18 is a perspective view of a portion of an improved screw press housing having controlled variable slots between screen bars in conjunction with a conventional screw press dewatering system.

Annular rings 232 and 256 are formed of outer rings 272 and 274 respectively and inner rings 272' and 274' respectively. Outer rings 272 and 274 include mounting ears 238 and 260 respectively which serve to secure the annular rings 232 and 256 in place on rigid longitudinal mounting rods 240 as shown.

Each screen bar 242 is approximately twice as long as each of the screen bars 246 and is adapted to be securely engaged by aperture 252 between inner and outer rings 272' and 272 respectively by threaded fasteners 236 in groove 234. Each screen bar 242 is similarly adapted to be secured by aperture 250 between inner and outer rings 274' and 274 respectively by threaded fasteners 258 in groove 264 as shown.

Figure 19:
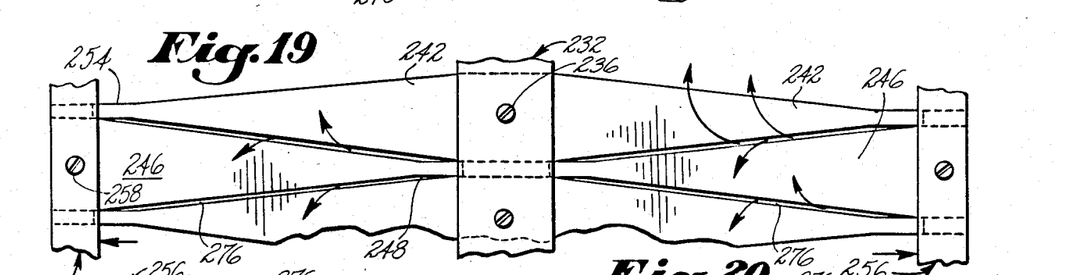
FIG. 19 is a view in the direction of arrows 19—19 in FIG. 18.
Figure 20:
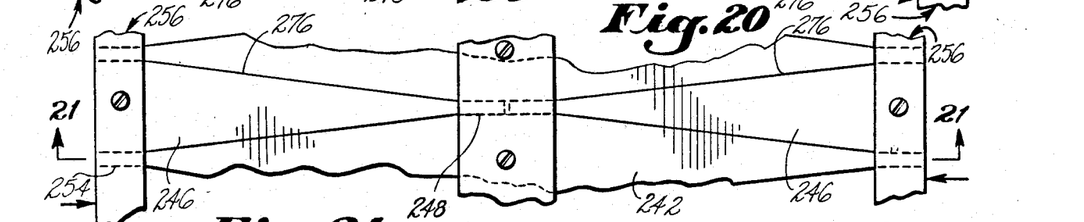
FIG. 20 is a view similar to FIG. 19 wherein the screen bars have been adjusted to their "zero" fluid discharge slot position.
Figure 21:
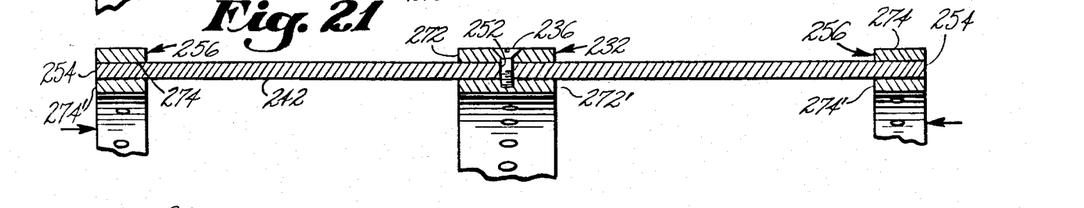
FIG. 21 is a section view in the arrows of 21—21 in FIG. 20.
Figure 22:
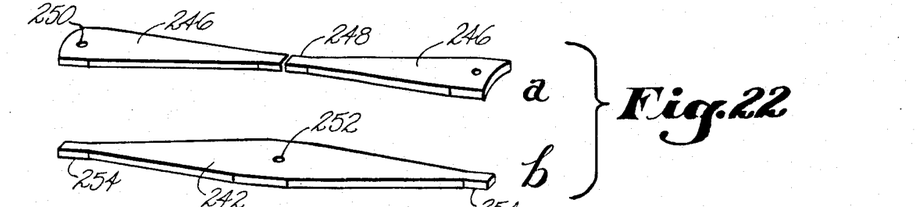
FIG. 22 is a perspective view of the preferred embodiment of the mating screen bars shown in FIGS. 18 through 21.

Each of the unfastened ends 248 and 254 of screen bars 246 and 242 respectively are adapted to be slidlingly supported within the corresponding grooves 234 and 264 so as to facilitate the variability in the slots 276 between the screen bars 246 and 242. By this arrangement, then, as each of a pair of annular rings 256 are moved toward one another and the the annular ring 232 therebetween, slots 276 decrease in width as best seen in FIG. 20. Then slots 276 increase to a maximum as shown in FIG. 19, wherein the annular rings 256 have been moved away from annular ring 232 such that the ends 248 and 254 of screen bars 246 and 242 respectively are minimally engaged within the grooves 234 and 264 provided in the annular rings 232 and 256 respectively.

The annular rings 232 and 256 are mounted securely in side-by-side arrangement as shown in FIG. 18 by mounting bars 238 and 260 onto elongated rigid mounting rods 240. Annular rings 256 are longitudinally repositionable and securable there by lock nuts 262, while annular ring 232 is held stationary in position on mounting rod 240. Resilient disks 280, held in position between mating adjacent annular rings 256, are provided to take up the longitudinal displacement of annular rings 256 without causing any gap to occur therebetween which might otherwise result in the inadvertent discharge of fibrous material under pressure therefrom.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A drainage system for expressing liquids and fluids from fibrous materials comprising:
   a plurality of spaced apart compression elements retained in position in a side-by-side arrangement forming a fluid escape slot between each said compression element;
   each said compression element having a longitudinal passageway therethrough, each said passageway having an inlet and an outlet and forming a continuous compression conduit longitudinally through said drainage system;
   said compression conduit having an inlet and an outlet generally forming an intake and an exit, respectively, for said drainage system;
   said intake for receiving fibrous materials under pressure and said exit for discharging expressed fibrous materials;
   each said passageway tapering inwardly from said passageway inlet to said passageway outlet;
   each said slot sized to allow expressed liquid to flow radially outwardly therethrough from said passageways as the fibrous material is forceably urged through said compression conduit.

2. A drainage system as set forth in claim 1, wherein: each said passageway is a truncated cone.

3. A drainage system as set forth in claim 2, wherein: said passageway taper has a preferred range of from about 1 to 20 degrees.

4. A drainage system as set forth in claim 1, wherein: at least a portion said passageway tapers vary in nominal transverse size along the length of said compression conduit.

5. A drainage system as set forth in claim 1, wherein: each said fluid escape slot is adjustable in width.

6. A drainage system as set forth in claim 1, further comprising:
   means for adjusting each said slot width.

7. A drainage system as set forth in claim 6, wherein said slot adjusting means includes:
   mating spiral end contours forming passageway inlets and outlets of each said compression element;
   said mating spiral end contours adapted to increase said slot when one said compression element is rotated in one direction in relation to each said adjacent compression element;
   said mating spiral end contours adapted to decrease eaoh said slot when one said compression element is rotated in the opposite direction in relation to each said adjacent compression element.

8. A drainage system as set forth in claim 6, wherein said slot adjusting means includes:
   compressive spring bias means between each said adjacent compression element for controlled urging of said adjacent compression elements apart one to another in response to a particular longitudinal setting of an adjustable retaining means for retaining said compression elements in said side-by-side arrangement.

9. A drainage system as set forth in claim 6, wherein: said adjustable slot has a preferred range of from about 0.001" (inches) to 0.120" (inches).

10. A drainage system as set forth in claim 1, wherein: said exit is connectable to a conveyance conduit for remote discharge of the expressed fibrous material.

11. A drainage system as set forth in claim 1, wherein: said system longitudinal axis is upright for enhanced pressurization of the bibrous material passing through said compression conduit and form improved uniform outflow of fluids through said slots.

12. A drainage system as set forth in claim 11, further comprising:
   a restrictive plug held in position adjacent said exit;
   said plug forming a restriction ot the flow of the fibrous material out said exit;
   said plug adjustable in position in relaltion to said exit to provide controlled variation in pressure within said compression conduit.

13. A drainage system as set forth in claim 1, wherein: said system is connectable in seriatim to other forms of expressing systems for enhanced fluid removal efficiency.

* * * * *